UNITED STATES PATENT OFFICE.

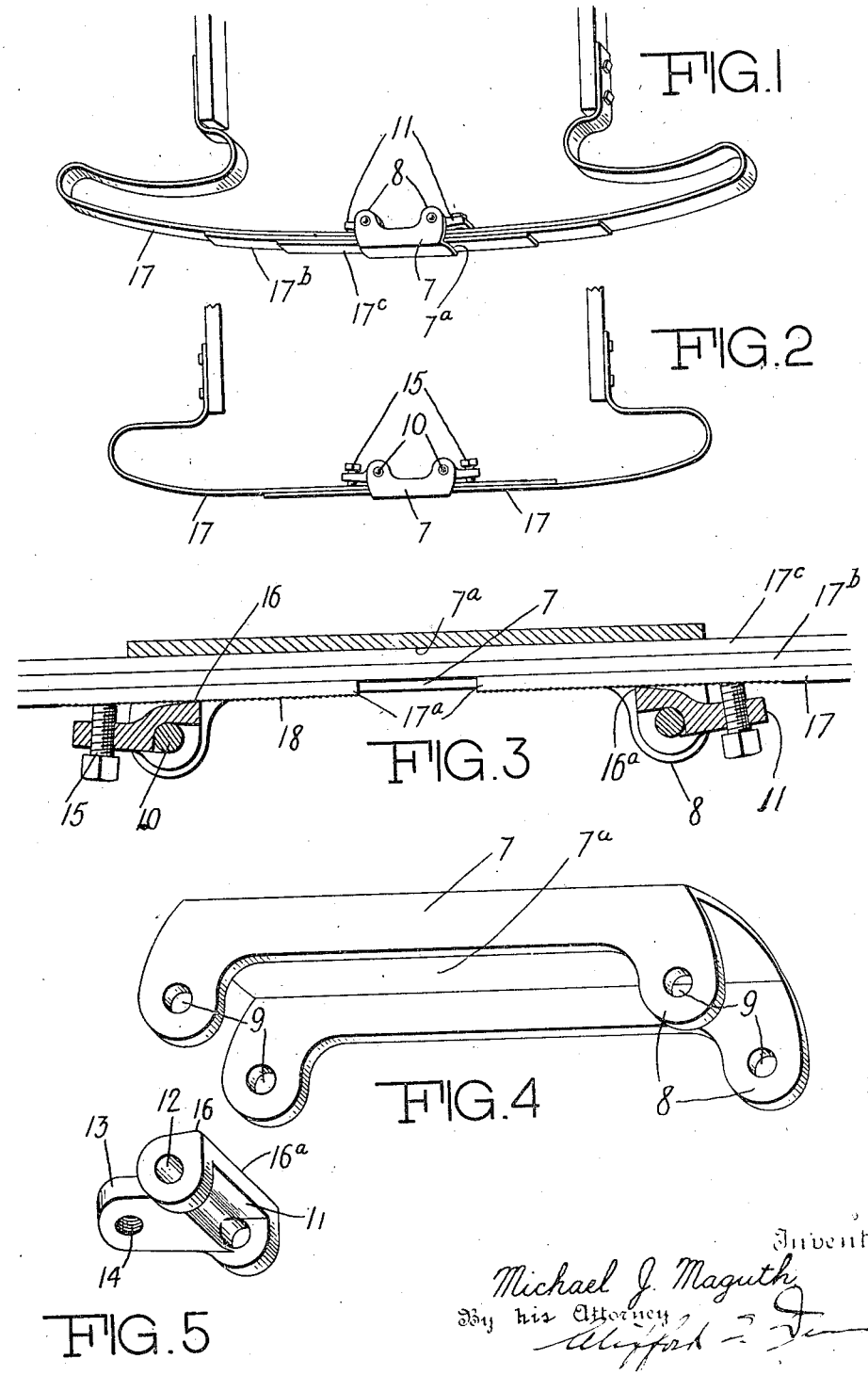

MICHAEL J. MAGUTH, OF CARLSTADT, NEW JERSEY.

CLAMPING DEVICE.

1,352,296.     Specification of Letters Patent.     Patented Sept. 7, 1920.

Application filed November 25, 1916. Serial No. 133,299.

*To all whom it may concern:*

Be it known that I, MICHAEL J. MAGUTH, a citizen of the United States, residing at Carlstadt, county of Bergen, and State of New Jersey, have invented certain new and useful Improvements in Clamping Devices, of which the following is a full, clear, and concise description.

The present invention relates generally to improvements in bumpers for motor vehicles and is more particularly directed to the provision of a means for attaching the sections or parts of a bumper of a yieldable type, such for instance, as that disclosed in my Patent No. 1,194,405, issued August 15, 1916, for automobile bumpers.

In bumpers of the general type disclosed in my aforesaid patent, it is customary to form or build up the impact receiving surface of a plurality of leaves depending upon the flexibility and strength of the metal and the type of vehicle to which the bumper is to be attached. Furthermore, in some constructions of this particular type, in order to permit of lateral adjustability of the bumper and to facilitate its attachment to motor cars, the main leaf of the bumper is formed in two sections, the inner ends being spaced slightly apart, when the bumper is in normal position and this space being covered by one of the supplemental leaves. It is obvious that where a plurality of leaves are employed to build up the impact receiving surface, suitable clamping means must be provided to secure the supplemental leaves to the main leaf and in such cases where the main leaf is formed of two sections. to fasten these sections in such a manner that they will be maintained in alinement and will not spring apart and destroy the effectiveness of the bumper.

The primary object of my invention is to provide a simple and efficient securing or clamping device, which may be readily applied to the several parts or sections of a yieldable bumper, so as to firmly hold the supplemental leaves and sections of the main leaf together without impairing the yieldability or general efficiency of the bumper under whatever conditions of use the vehicle to which it is applied may be subjected.

A further object of my invention is to provide a clamping device for the purposes heretofore stated, which may be applied to a bumper without making it necessary to drill, cut or otherwise mar the surfaces of the leaves or sections thereof and which may be securely and firmly fastened in position by the expenditure of a minimum amount of energy, thereby enabling any one who is unversed in mechanics to assemble and properly mount a bumper in connection with which my invention is employed.

My invention also comprehends a clamping device possessing the general characteristics and adavantages described, which possesses a minimum number of parts and may be given a curved or straight conformation to harmonize with the shape of the impact receiving member. By this means, the clamping device virtually merges into the lines of the impact receiving surface and in no way detracts from the pleasing appearance and ornamental effect of the bumper.

While in the present disclosure, I have shown my invention as applied to an automobile bumper of the yielding or leaf type, it is obvious that it is susceptible of employment in connection with other types of bumpers and that it may also be employed for other purposes where a clamping device is required. I would, therefore, have it understood that I do not limit myself to the specific uses herein pointed out, nor to the particular details of structure shown and described, since, it is manifest that various changes in construction thereof may be made to meet special conditions or requirements without departing from the spirit and scope of my invention.

I shall now proceed to describe my invention with reference to the accompanying drawings, and then point out with more particularity, the essential elements of novelty therein, in the appended claims.

In the drawings,

Figure 1 is a top plan view of a yieldable motor vehicle bumper, built up of a plurality of leaves showing my invention applied thereto.

Fig. 2 is a similar view illustrating my invention applied to a yieldable bumper of a type, wherein the supplemental leaves are omitted, the ends of the sections of the main leaf overlapping.

Fig. 3 is a view partly in section disclosing the construction of my clamping device and the relative position of the parts thereof and the main leaf and supplemental leaves of a bumper of the type illustrated in Fig. 1.

Fig. 4 is a view in perspective of the body portion of the clamp, and

Fig. 5 is a view in perspective of one of the movable cam-like clamping members.

Referring now to the drawings in detail in which like characters of reference are employed to designate similar parts throughout the several views, 7 represents the bracket or bed portion of my improved clamping device which may be made of a single casting of any suitable material and is preferably of the configuration herein shown. It is obvious, however that this bracket may be made in any shape suitable to the purpose and that its upper surface may conform to the contour of the impact receiving surface of the bumper or other member in conjunction with which it is used, so as to practically merge thereinto.

The sides of the bracket 7 are formed with the extension portions or ears 8, which are apertured at 9 to form bearings for a stud or bolt 10 for securing the cam-like clamping members 11 within the bracket in operative position.

The clamping members are preferably of the shape shown, the sides thereof being apertured at 12 for the reception of the stud or bolt 10, an intermediate extension 13 being provided having the function of a lever which is formed with a threaded opening 14 through which the adjusting bolt or stud 15 is adapted to pass, the threads of the latter meshing with the threads in the opening 14. As will be apparent, the clamping member 11 is formed with a cam surface 16, which is adapted for engagement with the leaves of the bumper as hereinafter described.

In assembling my improved clamping means as used in conjunction with a bumper such as herein shown, the main portions or leaves 17 of the bumper are placed in position so that the inner ends thereof, indicated at 17$^a$, are substantially in alinement, after which the bracket, having the clamping members 11 pivotally mounted therein by means of the bolts 10 is freely passed over the free end of each leaf and positioned intermediately of the ends of the bumper. The supplemental leaves 17$^b$ and 17$^c$ may then be placed in position as shown in Figs. 1 and 3, and the adjusting or securing bolts or studs 15 screwed home and tightened, the ends thereof bearing against the inner surfaces of the main leaves of the bumper and effecting the movement of the extensions or lever portions 13 of the clamping members away from the leaves, thereby forcing the cam surfaces of the clamping members into engagement with the leaves. As the application of pressure in this manner increases, it is obvious, that all of the leaves of the bumper will be firmly clamped between the inner face of the bed portion 7$^a$ of the bracket and the clamping members, the latter of which are of the same transverse width as the leaves of the bumper, thus insuring rigid and positive locking of the parts in engagement. If desired, the inner surfaces of the leaves 17 may be corrugated or provided with serrations as shown at 18 for engagement by the nose 16$^a$ of the clamping device. It is manifest that when the clamping devices are so locked in position, there will be no possibility of the leaves 17 pulling apart, owing to the pressure exerted by the clamping devices on each adjacent leaf at two points.

While I have shown and described my invention used in conjunction with a motor vehicle bumper, it is obvious that it may also be employed for other purposes where a clamping device is required, and I would have it understood that I do not limit myself to the specific details of construction or uses herein specifically set forth, as various structural changes may be made and my invention employed in many ways without departing from the spirit and scope thereof.

Having thus described my invention, what I claim as new and desire to secure by Letters Patent, is:

1. In combination with a spring buffer for motor vehicles formed of a plurality of sections, certain of said sections having their ends spaced apart and overlapped by other of said sections, a clamping device embodying a pair of cam levers for locking all of said sections in frictional engagement, each of said cam levers exerting pressure on the adjacent section at two points to maintain the spaced ends in alinement.

2. In combination with a buffer for motor vehicles having an impact receiving surface and formed of a plurality of sections, a clamping device having a bed portion constituting a part of the impact surface, and a plurality of cam levers carried by said bed portion for locking all of said sections in frictional engagement to form a unitary structure.

3. In combination with a spring buffer for motor vehicles formed of a plurality of sections, a clamping device comprising a bed portion and a plurality of cam levers fulcrumed therein and adapted to maintain all of said sections in frictional engagement to form a unitary structure, each of said cam levers having two points of contact with the contiguous section of said buffer.

4. In combination with a spring buffer for motor vehicles formed of a plurality of sections, certain of said sections having their ends spaced apart and being overlapped by other of said sections, a clamping device for applying pressure on said sections and locking all of said sections in frictional engagement, said clamping device comprising a bed portion having a plurality of cam levers fulcrumed therein, means carried by one portion of each lever for exerting a leverage force, whereby its cam surface will function upon the contiguous leaf of the buffer, the leverage imparting means being in contact with said section.

5. In combination with a spring buffer for motor vehicles formed of a plurality of leaves, a clamping device and clamping members pivoted therein, said clamping members carrying means to impart a force of leverage thereto in a direction to rigidly lock all of said leaves within said clamping device to form a unitary yieldable structure.

6. The combination with a spring buffer for motor vehicles formed of a plurality of sections, a clamping device comprising a bed portion having cam levers fulcrumed therein, set screws carried by said levers and adapted to contact with the surfaces of the adjacent buffer section, whereby the adjustment of said screws will actuate said levers to rigidly lock said sections between their cam surfaces and the bed portion of said clamping device, the said screws effecting the clamping action of the cam surfaces.

7. In combination with a buffer for motor vehicles comprising a plurality of coöperating sections, a clamping device for frictionally locking said sections together in operative position, said clamping device comprising a cradle adapted to form a portion of the impact surface of the buffer, a plurality of cam levers pivotally mounted in said cradle, means carried by said levers for operating the levers to produce a locking pressure upon the adjacent portions of the buffer.

MICHAEL J. MAGUTH.